(12) United States Patent
Chretien

(10) Patent No.: US 11,387,762 B1
(45) Date of Patent: Jul. 12, 2022

(54) CONTROLLER AND DRIVE CIRCUITS FOR ELECTRIC MOTORS

(71) Applicant: Regal Beloit America, Inc., Beloit, WI (US)

(72) Inventor: Ludovic Andre Chretien, Columbia City, IN (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 17/191,348

(22) Filed: Mar. 15, 2021

(51) Int. Cl.
*H02P 27/08* (2006.01)
*H02P 23/28* (2016.01)
*H02P 27/04* (2016.01)

(52) U.S. Cl.
CPC ............ *H02P 27/047* (2013.01); *H02P 23/28* (2016.02); *H02P 27/08* (2013.01)

(58) Field of Classification Search
CPC .......... H02P 27/06; H02P 27/04; H02P 27/08; H02P 23/28; H02P 1/26; H02P 2207/01; H02P 21/34
See application file for complete search history.

(56) References Cited

U.S. PATENT DOCUMENTS

| | | | |
|---|---|---|---|
| 4,459,535 A | 7/1984 | Sohutten et al. | |
| 5,068,590 A | 11/1991 | Glennon et al. | |
| 5,402,053 A | 3/1995 | Divan et al. | |
| 6,051,952 A | 4/2000 | Moreira et al. | |
| 6,282,910 B1 | 9/2001 | Helt | |
| 6,567,283 B2 | 5/2003 | Welches | |
| 6,570,778 B2 * | 5/2003 | Lipo | H02P 1/44 318/807 |
| 6,801,013 B2 * | 10/2004 | Woodward | H02P 25/04 318/729 |
| 6,952,088 B2 | 10/2005 | Woodward et al. | |
| 7,272,302 B2 | 9/2007 | Woodward et al. | |
| 7,952,316 B2 | 5/2011 | Ganev et al. | |
| 8,766,489 B2 | 7/2014 | Lathrop | |
| 8,853,992 B2 | 10/2014 | Boom | |

(Continued)

FOREIGN PATENT DOCUMENTS

| | | |
|---|---|---|
| BR | PI0622229 A2 | 1/2012 |
| CN | 111472968 A | 7/2020 |

(Continued)

*Primary Examiner* — Thai T Dinh
(74) *Attorney, Agent, or Firm* — Armstrong Teasdale LLP

(57) ABSTRACT

An electric motor system is described. The electric motor system includes a drive circuit configured to supply variable frequency current and a contactor configured to supply line frequency current, wherein the drive circuit includes a three-phase inverter and an H-bridge including two phases of the inverter. The electric motor system also includes an electric motor and a controller. The controller is configured to control the inverter to supply variable frequency current to the electric motor over a first duration and determine to control the drive circuit to transition from supplying variable frequency current to supplying line frequency current. The controller is also configured to determine a polarity of a sensed alternating current (AC) voltage, disable at least two switches of the H-bridge, and control the contactor to close, thereby preventing the contactor and the inverter from energizing the electric motor at the same time once the contactor is closed.

20 Claims, 7 Drawing Sheets

(56) References Cited

U.S. PATENT DOCUMENTS

| | | | |
|---|---|---|---|
| 9,800,188 B2 | 10/2017 | Chretien et al. | |
| 10,439,540 B1 | 10/2019 | Chretien et al. | |
| 10,819,254 B2 * | 10/2020 | Chretien | H02P 1/445 |
| 10,840,830 B2 | 11/2020 | Chretien et al. | |
| 2003/0000801 A1 | 1/2003 | Spannhake et al. | |
| 2003/0043606 A1 | 3/2003 | Lipo et al. | |
| 2008/0290824 A1 | 11/2008 | Choi et al. | |
| 2009/0218968 A1 * | 9/2009 | Jeung | H02P 6/182 |
| | | | 388/811 |
| 2014/0356686 A1 | 12/2014 | Namou et al. | |
| 2016/0254768 A1 * | 9/2016 | Falkowski | F02D 41/005 |
| | | | 290/40 C |
| 2017/0077857 A1 | 3/2017 | Chretien et al. | |

FOREIGN PATENT DOCUMENTS

| | | |
|---|---|---|
| EP | 1268323 B1 | 9/2015 |
| JP | 03993793 B2 | 10/2007 |

* cited by examiner

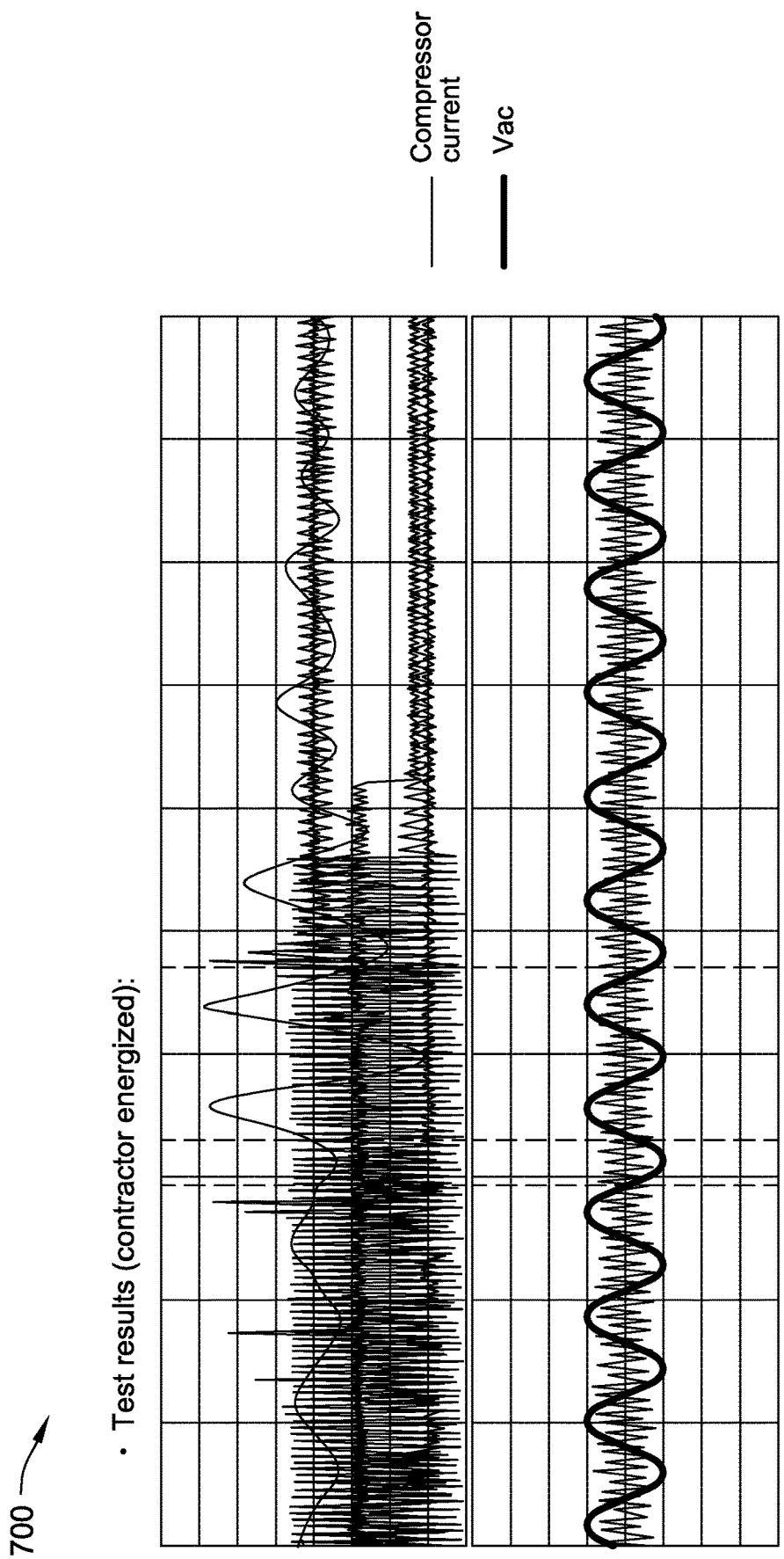

CONTROLLER AND DRIVE CIRCUITS FOR ELECTRIC MOTORS

BACKGROUND

The field of the disclosure relates generally to electric motors, and specifically to a motor controller controlling a drive circuit by simplifying the process of the motor controller controlling the drive circuit to transition from using an inverter to supplying line frequency power.

At least some known electric motors are fixed speed motors that operate most efficiently at line frequency power. Such motors exhibit uncontrolled acceleration during startup. Further, at low load conditions, such motors operate less efficiently. Alternatively, some induction motors may be driven with a variable speed motor controller to adapt motor speed to a load level. Such configurations are generally limited by power factor, electromagnetic interference, and electrical losses.

A drive circuit for certain motors enables efficient operation at both high and low load conditions. For example, a motor operating a compressor in a heating, ventilation and air conditioning (HVAC) system may experience high load conditions during peak temperatures and low load conditions during milder temperatures. The drive circuit operates the motor using an inverter under low load conditions, and operates the motor using line frequency power under high load conditions.

Transitioning from using an inverter to supplying line frequency power presents significant challenges. For example, compressors may stall or experience significant loss of speed within one line cycle. Further, a contactor closing to connect a motor to line frequency power may require between one and two line cycles to open/close, thereby causing the motor to stall or experience significant loss of speed during the opening/closing. Further, the contactor and inverter cannot operate at the same time because of the risk of creating a line to line short circuit. Current systems may utilize one or more triodes for alternating current (TRIACs), or any arrangement of semi-conductor switches offering 4 quadrant operation, in order to supply power to the motor during above-mentioned contactor closing delay when transitioning from inverter to line frequency power. However, TRIACs, or other suitable arrangement of semi-conductor switches offering 4 quadrant operation, can be costly and consume valuable surface area in electronics equipment. Accordingly, systems and methods for controlling the drive circuit to safely transition from using an inverter to supplying line frequency power without the use of additional switches/TRIACs are desired.

BRIEF DESCRIPTION

In one aspect, an electric motor system is described. The electric motor system includes a drive circuit configured to supply variable frequency current over a first duration and a contactor configured to supply line frequency current over a second duration, wherein the drive circuit includes a three-phase inverter and an H-bridge including two phases of the inverter. The electric motor system also includes an electric motor coupled to the drive circuit, and a controller communicatively coupled to the drive circuit. The controller is configured to control the inverter to supply variable frequency current to the electric motor over the first duration and determine to control the drive circuit to transition from supplying variable frequency current to supplying line frequency current. The controller is also configured to determine a polarity of a sensed alternating current (AC) voltage, disable, based upon the determined polarity of the sensed AC voltage, at least two switches of the H-bridge, and control the contactor to close, thereby preventing the contactor and the inverter from energizing the electric motor at the same time once the contactor is closed.

In another aspect, an electric motor is described. The electric motor includes a drive circuit configured to supply variable frequency current over a first duration and a contactor configured to supply line frequency current over a second duration, wherein the drive circuit includes a three-phase inverter and an H-bridge including two phases of the inverter. The electric motor also includes a controller communicatively coupled to the drive circuit. The controller is configured to control the inverter to supply variable frequency current to the electric motor over the first duration and determine to control the drive circuit to transition from supplying variable frequency current to supplying line frequency current. The controller is also configured to determine a polarity of a sensed alternating current (AC) voltage, disable, based upon the determined polarity of the sensed AC voltage, at least two switches of the H-bridge, and control the contactor to close, thereby preventing the contactor and the inverter from energizing the electric motor at the same time once the contactor is closed.

In yet another aspect, a method of operating an electric motor is described. The electric motor is coupled to a drive circuit that is communicatively coupled to a controller, wherein the drive circuit is configured to supply variable frequency current over a first duration and a contactor configured to supply line frequency current over a second duration, wherein the drive circuit includes a three-phase inverter and an H-bridge including two phases of the inverter. The method includes controlling the inverter to supply variable frequency current to the electric motor over the first duration and determining to control the drive circuit to transition from supplying variable frequency current to supplying line frequency current. The method also includes determining a polarity of a sensed alternating current (AC) voltage, disabling, based upon the determined polarity of the sensed AC voltage, at least two switches of the H-bridge, and controlling the contactor to close, thereby preventing the contactor and the inverter from energizing the electric motor at the same time once the contactor is closed.

BRIEF DESCRIPTION OF THE DRAWINGS

FIGS. 4-7 are diagrams of exemplary results produced by the exemplary drive circuit for an electric motor in accordance with the present disclosure.

DETAILED DESCRIPTION

In operating an electric motor (e.g., and a mechanical compressor driven by the electric motor), a drive circuit for the electric motor drives the electric motor with an inverter under low load conditions and with line frequency power under high load conditions. Generally, the inverter and line frequency power cannot both be connected to the electric motor at the same time, because of the potential for a line-to-line short circuit. To transition from inverter to line, or line to inverter, one is disconnected before connecting the other.

When transitioning from the inverter to line frequency power, a contactor closing to connect a motor to line frequency power may require between one and two line cycles to open/close, thereby causing the motor to stall or experience significant loss of speed during the opening/closing. Further, the contactor and inverter cannot operate at the same time because of the risk of creating a line to line short circuit.

Accordingly, the drive circuit described herein is in communication with at least one controller (e.g., a motor controller, a system controller, etc.) that controls, during the transition from the inverter to line frequency power, power supply to the motor during the above-mentioned contactor closing delay without requiring the use of costly and space-taking additional solid state switches such as TRIACs.

In the example embodiment, the at least one controller is configured, when controlling the transition from supplying variable frequency current to supplying line frequency current, to disable a third leg of the inverter (e.g., wherein the first two legs of the inverter form an H-bridge), commutate a start winding of the electric motor, synchronize motor speed to a desired level so as to minimize motor slip during the transition, and/or minimize inverter current prior to the transition, and synchronize the phase of motor voltage to a desired level in order to minimize out of phase current while transitioning from inverter to line operation. Further, to control power supply during the above-mentioned contactor delay, the controller is configured to determine a polarity of a sensed alternating current (AC) voltage, disable, based upon the determined polarity of the sensed AC voltage, at least two switches of the H-bridge, and control the contactor to close, thereby preventing the contactor and the inverter from energizing the motor at the same time. Controlling the contactor to close may include controlling the contactor to begin closing and controlling pulse width modulation (PWM) at the electric motor (e.g., controlling duty cycle, frequency, amplitude, etc. of power delivered to the electric motor) until the contactor is closed (e.g., after 1.5 line cycles are complete).

Figure 1:
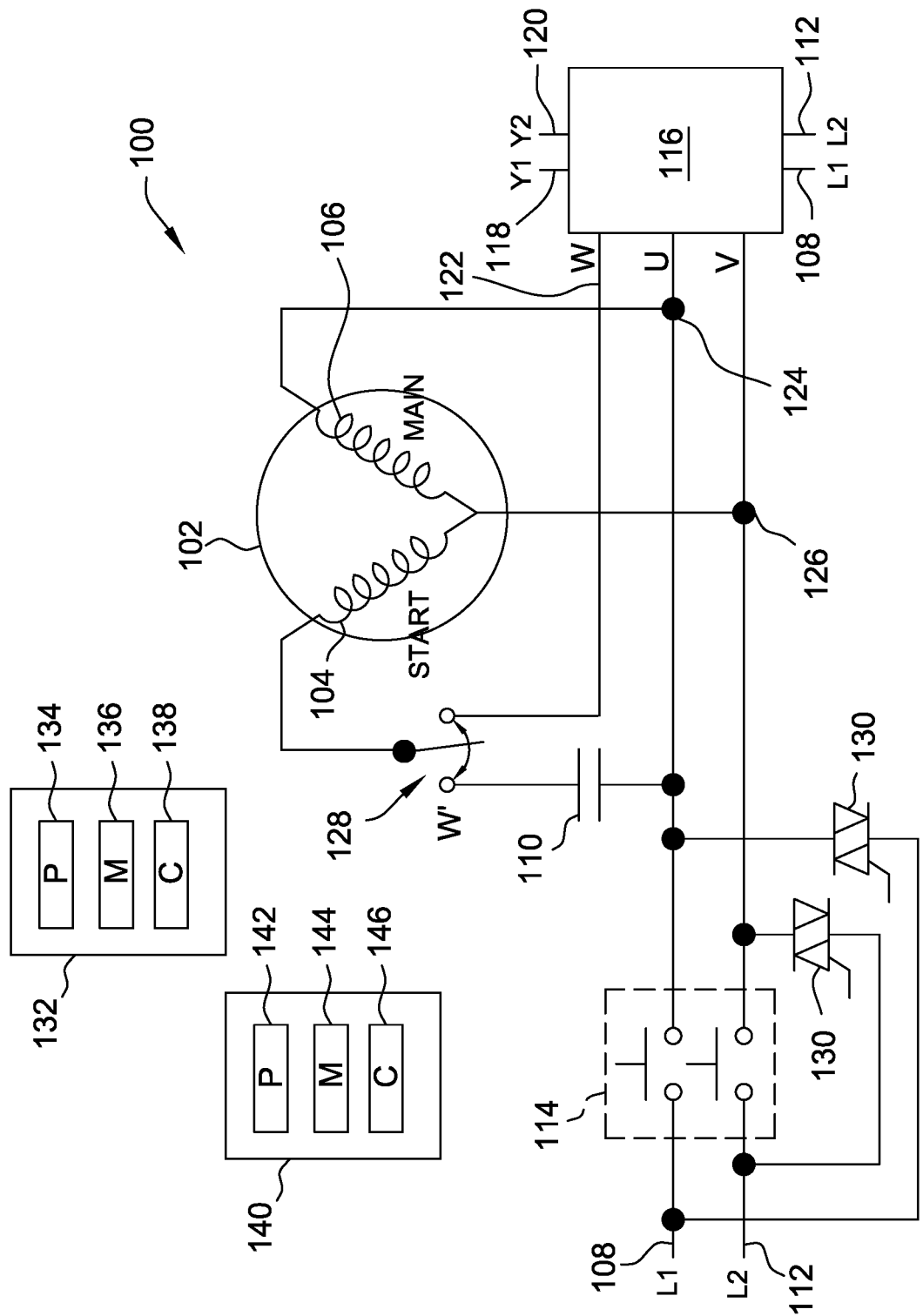
FIG. 1 is a schematic diagram of an exemplary drive circuit for an electric motor.

FIG. 1 is a schematic diagram of an exemplary drive circuit 100 for a PSC motor 102 including solid state switches 130 (e.g., TRIACs) similar to some known systems. PSC motor 102 includes a start winding 104 and a main winding 106. During normal line frequency operation, line frequency current, such as 50 Hertz or 60 Hertz, for example, is supplied on a first line, or L1, 108 to start winding 104 through a capacitor 110, and to main winding 106. A second line, or L2, 112 provides a return, or neutral, for the line frequency current. Drive circuit 100 includes a contactor 114 for connecting and disconnecting L1 and L2 to PSC motor 102. Contactor 114 may include a two pole mechanical contactor that is commutated by energizing a coil (not shown). In certain embodiments, capacitor 110 may be coupled to L1 on either side of contactor 114.

Drive circuit 100 includes an inverter 116 that is enabled to drive PSC motor 102 with variable frequency power under low load, or at least less than full load, conditions. In some embodiments, inverter 116 is supplied line frequency power on L1 and L2, and is controlled over control lines 118 and 120, or Y1 and Y2. In some embodiments, inverter 116 may be controlled by any other suitable means, including, for example, digital control signals (e.g., serial communication or Modbus communication) and analog control signals (e.g., transmitted from motor controller 132 or system controller 140). Inverter 116 enables variable speed operation of PSC motor 102 by regulating phase and frequency of alternating current (AC) voltages on output terminals W, U, and V. Terminal W is coupled to a node 122, terminal U is coupled to a node 124, and terminal V is coupled to a node 126. Drive circuit 100 includes a bypass switch 128 that enables bypass of capacitor 110 during operation through inverter 116. When driven by inverter 116, start winding 104 of PSC motor 102 is coupled across nodes 122 and 126, i.e., terminals W and V of inverter 116, and main winding 106 is coupled across nodes 124 and 126, i.e., terminals U and V of inverter 116.

When operating PSC motor 102 using inverter 116, contactor 114 is open and inverter 116 is enabled via control lines 118 and 120, or other suitable control means. To transition to line frequency power, inverter 116 is disabled and contactor 114 is closed to couple L1 and L2 directly to PSC motor 102. Contactor 114 may require one to two line cycles to close.

In some known systems, drive circuit 100 includes solid state switches 130 coupled in parallel with the two poles of contactor 114 on L1 and L2. During the transition from inverter 116 to line frequency power, and after inverter 116 is disabled, solid state switches 130 are closed to couple L1 and L2 directly to PSC motor 102. Solid state switches 130 remain closed and conduct line frequency current until contactor 114 is closed. Once contactor 114 is closed, solid state switches 130 are opened to redirect the line frequency current through contactor 114. In some embodiments, contactor 114 and solid state switches 130 are connected to L1 and L2 through an input impedance (not shown) of inverter 116 (e.g., after EMI filter and inrush current limiter). However, solid state switches, such as TRIACs, can be costly and consume valuable surface area in electronics equipment. Accordingly, systems and methods for controlling the drive circuit to safely transition from using an inverter to supplying line frequency power without the use of these solid state switches are desired (e.g., as described with respect to FIG. 2).

Motor controller 132 is communicatively coupled to motor 102 to operate motor 102. Further, motor controller 132 may be coupled to one or more additional components of drive circuit 100, including inverter 116, contactor 114, solid state switches 130, and control lines 118 and 120 (Y1 and Y2). More specifically, motor controller 132 transmits control signals to operate motor 102. In the example embodiment, by adjusting the control signals, motor controller 132 is configured to control inverter 116 to supply variable frequency current to motor 102 as described above. Further, motor controller 132 is configured to adjust the control signals to control the transition from inverter 116 supplying variable frequency power, to supplying line frequency power as described above (e.g., from L1 and L2). For example, in some embodiments, motor controller 132 and inverter 116 are embodied in the same drive (e.g., such that motor controller 132 receives signals from control lines 118 and 120, and then commands inverter 116 based upon the received signals). In some embodiments, motor controller 132 may be communicatively coupled to another controller (e.g., system controller 140) associated with motor 102. In such embodiments, motor controller 132 may be configured to allow system controller 140 to operate motor 102. In the exemplary embodiment, motor controller 132 is separate from motor 102. In one example, motor controller 132 and inverter 116 may be integrated with motor 102. In another example, motor controller 132 and/or system controller 140 is an external controller, such as a thermostat system controller. In some embodiments, motor controller 132 and system controller 140 may be integrated in the same controller (e.g., any description of motor controller 132 may be integrated in system controller 140, or any other controller, and vice versa).

In an example embodiment, motor controller 132 includes processor 134, memory 136 communicatively coupled to processor 134, and communications interface 138. Motor controller 132 is also communicatively coupled system controller 140. Processor 134 is configured to execute instructions stored within memory 136 to cause motor controller 132 to function as described herein. Moreover, memory 136 is configured to store data to facilitate controlling motor 102. In some embodiments, motor controller 132 may include a plurality of processors 134 and/or memories 136. In other embodiments, memory 136 may be integrated with processor 134. In one example, memory 136 includes a plurality of data storage devices to store instructions and data as described herein. Communications interface 138 may include one or more wired or wireless hardware interface such as, for example, universal serial bus (USB), RS232, RS485, or other serial bus, CAN bus, Ethernet, near field communication (NFC), WiFi, Bluetooth, or any other suitable digital or analog interface for establishing one or more communication channels. The established communication channels may include, for example, channels between motor controller 132 and system controller 140. Communications interface 138 further includes a software or firmware interface for receiving one or more motor control parameters and writing them, for example, to memory 136. In some embodiments, communication interface 138 includes, for example, a software application programming interface (API) or command set for controlling, as an example, a contactor to close when transitioning from using an inverter to supplying line frequency power.

In the exemplary embodiment, system controller 140 includes processor 142, memory 144 communicatively coupled to processor 142, and communications interface 146. System controller 140 is also communicatively coupled motor controller 132. Processor 142 is configured to execute instructions stored within memory 144 to cause system controller 140 to function as described herein. In some embodiments, system controller 140 may include a plurality of processors 134 and/or memories 136. In other embodiments, memory 144 may be integrated with processor 142. In one example, memory 144 includes a plurality of data storage devices to store instructions and data as described herein. Communications interface 146 may include one or more wired or wireless hardware interface such as, for example, universal serial bus (USB), RS232 or other serial bus, CAN bus, Ethernet, near field communication (NFC), WiFi, Bluetooth, or any other suitable digital or analog interface for establishing one or more communication channels. The established communication channels may include, for example, channels between system controller 140 and motor controller 132. Communications interface 146 further includes a software or firmware interface for receiving one or more motor control parameters and writing them, for example, to memory 144. As explained above, in some embodiments, system controller 140 may be configured to perform any of the functions described herein with respect to motor controller 132 or any other controller.

Figure 2:
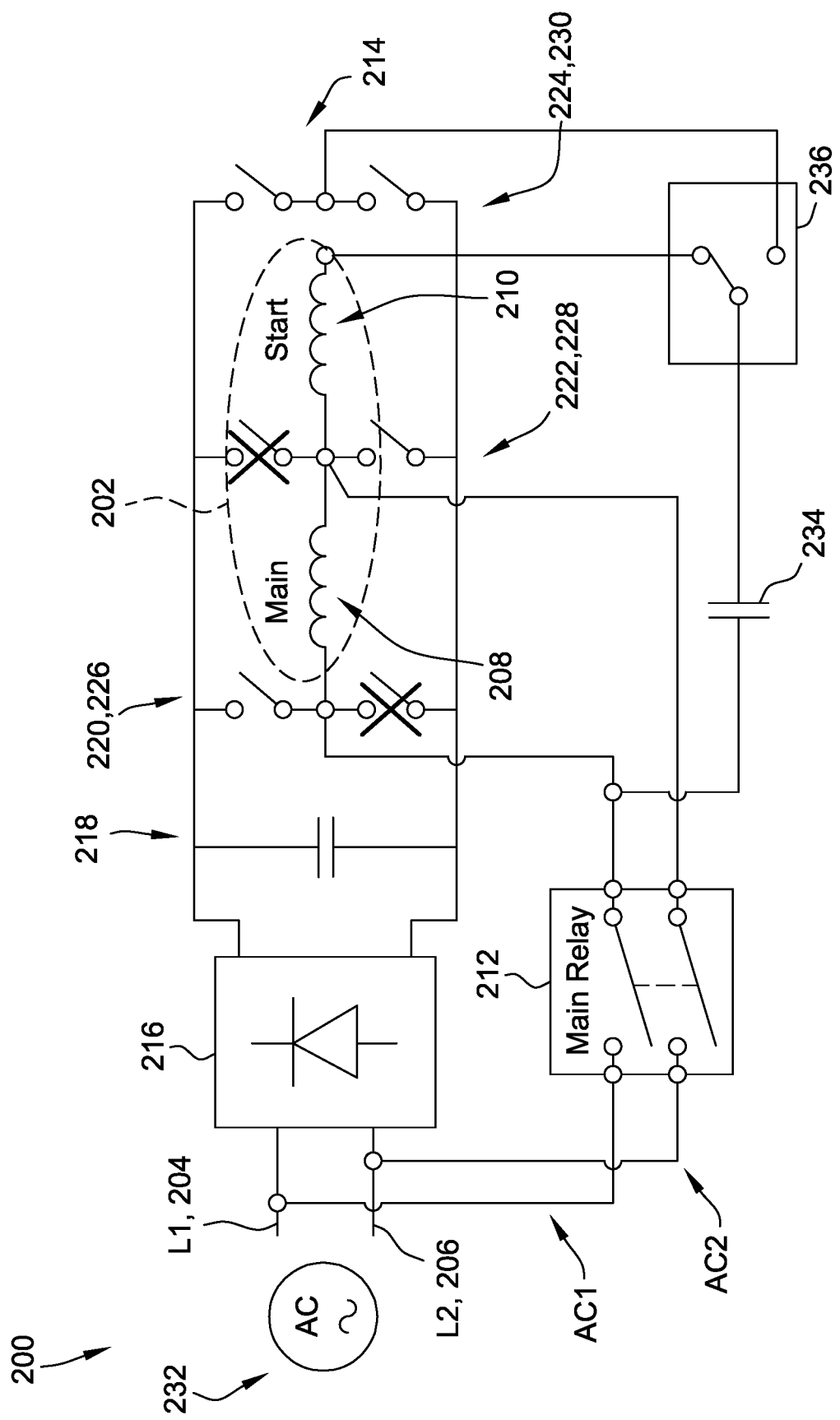
FIG. 2 is a schematic diagram of another exemplary drive circuit for an electric motor in accordance with the present disclosure.

FIG. 2 is a schematic diagram of drive circuit 200 for an electric motor 202, such as motor 102, without requiring the use of solid state switches 130 (e.g., TRIACs) while maintaining the reliable functionality of constantly providing current to motor 202 (e.g., specifically during transitioning from using an inverter to supplying line frequency power). During normal line frequency operation, line frequency current, such as 50 Hertz or 60 Hertz, for example, is supplied on a first line, or L1, 204, through a run capacitor 234 (e.g., capacitor 110), to a main winding 208, and to a start winding 210. The terms line frequency current, voltage, and/or power are used interchangeably herein to refer to direct electrical communication with AC source 232. A second line, or L2, 206 provides a return, or neutral, for the line frequency current. Drive circuit 200 includes a contactor 212 for connecting and disconnecting L1 and L2 to the PSC motor. Contactor 212 is a two pole mechanical contactor that is commutated by energizing a coil (not shown). In certain embodiments, a run capacitor may be coupled to L1 on either side of contactor 212. In some embodiments, a relay 236 may be coupled between the run capacitor and start winding 210.

Drive circuit 200 includes an inverter 214 (e.g., inverter 116) that is enabled to drive electric motor 202 with variable frequency power under low load, or at least less than full load, conditions. Inverter 214 is supplied line frequency power on L1 and L2. Inverter 214 enables variable speed operation of electric motor 202 by regulating amplitude, phase, and frequency of alternating current (AC) voltages on output terminals thereof, which are coupled to main winding 208 and start winding 210. When operating electric motor 202 using inverter 214, contactor 212 is open and inverter 214 is enabled via any suitable control means. To transition to line frequency power, at least a portion of inverter 214 is disabled (e.g., inverter 214 is operated in H-bridge mode, as described herein), contactor 212 is closed, and relay 236 may be commutated to couple L1 and L2 directly to electric motor 202.

Although electric motor 202 is illustrated as a PSC motor, it is recognized that other known motors (such as electronically commutated motors (ECMs)) also have integrated windings (e.g., between windings of a three-phase ECM). Electric motor 202 may be an induction motor, such as a PSC motor, or a permanent magnet motor, such as an ECM. Moreover, electric motor 202 may drive a compressor, or may drive any other fluid-moving apparatus, such as a fan, blower, impeller, pump, and the like.

Drive circuit 200 includes a rectifier 216, inverter 214 downstream from rectifier 216 and contactor 212. Contactor 212 may be embodied as mechanical/electromechanical contactors, electronic switches, and/or or solid-state switches. Under the first mode of operation, contactor 212 is open, and drive circuit 200 is configured to drive motor 202 using inverter 214. Inverter 214 enables variable speed operation of motor 202 by regulating current provided to main winding 208 and start winding 210, by controlling amplitude, phase, and frequency of current and voltage on output terminals thereof, which are coupled to main winding 208 and start winding 210.

In the example embodiment, inverter 214 includes a capacitor 218 and a plurality of switches arranged in three parallel sets of switches 220, 222, 224, also referred to as phases 226, 228, and 230, respectively, of inverter 214 (e.g., first set of switches 220 may be referred to as a first phase 226 of inverter, second set of switches 222 may be referred to as a second phase 228 of inverter 214, and third set of switches 224 may be referred to as a third phase 230 of inverter 214). Switches 220, 222 (e.g., and phases 226, 228) may be referred to as an H-bridge of inverter 214. When operating at variable speed frequency, start winding 210 is coupled to second phase 228 and is coupled to third phase 230 through bypass switch/relay 236.

Rectifier 216 rectifies power from AC source 232, capacitor 218 functions as a storage element for the rectified power from rectifier 216, and sets of switches 220, 222, 224 (phases 226, 228, and 230) to regulate current provided to windings 208, 210 in some modes of operation.

Contactor 212 may be controlled (e.g., closed, opened, commutated) by any suitable control means, such as, for example, a microcontroller, a field programmable gate array (FPGA), a digital signal processing (DSP) device, a remote system controller, a local system controller, and the like (e.g., motor controller 132 and system controller 140). Contactor 212 may be controlled to enable switching between supplying variable frequency power and line frequency power (e.g., driving second winding 210 using inverter 214 or directly with line frequency voltage and current from AC source 232).

In addition, drive circuit 200 has a simplified wiring scheme, compared to drive circuit 100 and other known drive circuits. In particular, drive circuit 200 includes a reduced number of wiring connections (e.g., because of the elimination of solid state switches 130). Further, drive circuit 200 is less costly and requires less surface area than drive circuit 100 (e.g., because of the elimination of solid state switches 130).

Accordingly, drive circuit 200 described herein is in communication with at least one controller (e.g., motor controller 132, system controller 140, etc.) and controls, during the transition from the inverter to line frequency power, power supply to motor 202 during the above-mentioned contactor 212 closing delay without requiring the use of costly and space-taking additional solid state switches such as TRIACs (e.g., solid state switches 130) while maintaining the reliable functionality of constantly providing current to motor 202 (e.g., specifically during transitioning from using inverter 214 to supplying line frequency power).

In the example embodiment, the at least one controller is configured to operate inverter 214 in an H-bridge mode, when controlling the transition from supplying variable frequency current to supplying line frequency current, to disable third phase 230 of inverter 214, commutate start winding 210 of electric motor 202 through bypass switch/relay 236, synchronize motor speed to a desired level so as to minimize motor slip during transition, and/or minimize inverter current prior to transition, and synchronize the phase of motor voltage to a desired level in order to minimize out of phase current while transitioning from inverter to line operation. Further, to control power supply during the above-mentioned contactor delay, the controller is configured to determine a polarity of a sensed alternating current (AC) voltage, disable, based upon the determined polarity of the sensed AC voltage, at least two switches of the H-bridge (e.g., the lower switch of switches 220 and the upper switch of switches 222), and control contactor 212 to close, thereby preventing contactor 212 and inverter 214 from energizing motor 202 at the same time once the contactor reaches its fully-closed state. In some embodiments, based upon the determined polarity of the sensed AC voltage, at least two different switches of the H-bridge may be disabled (e.g., the upper switch of switches 220 and the lower switch of switches 222). Controlling contactor 212 to close may include controlling contactor 212 to begin closing and controlling pulse width modulation (PWM) at electric motor 202 until contactor 212 is closed (e.g., after 1.5 line cycles are complete).

Figure 3:
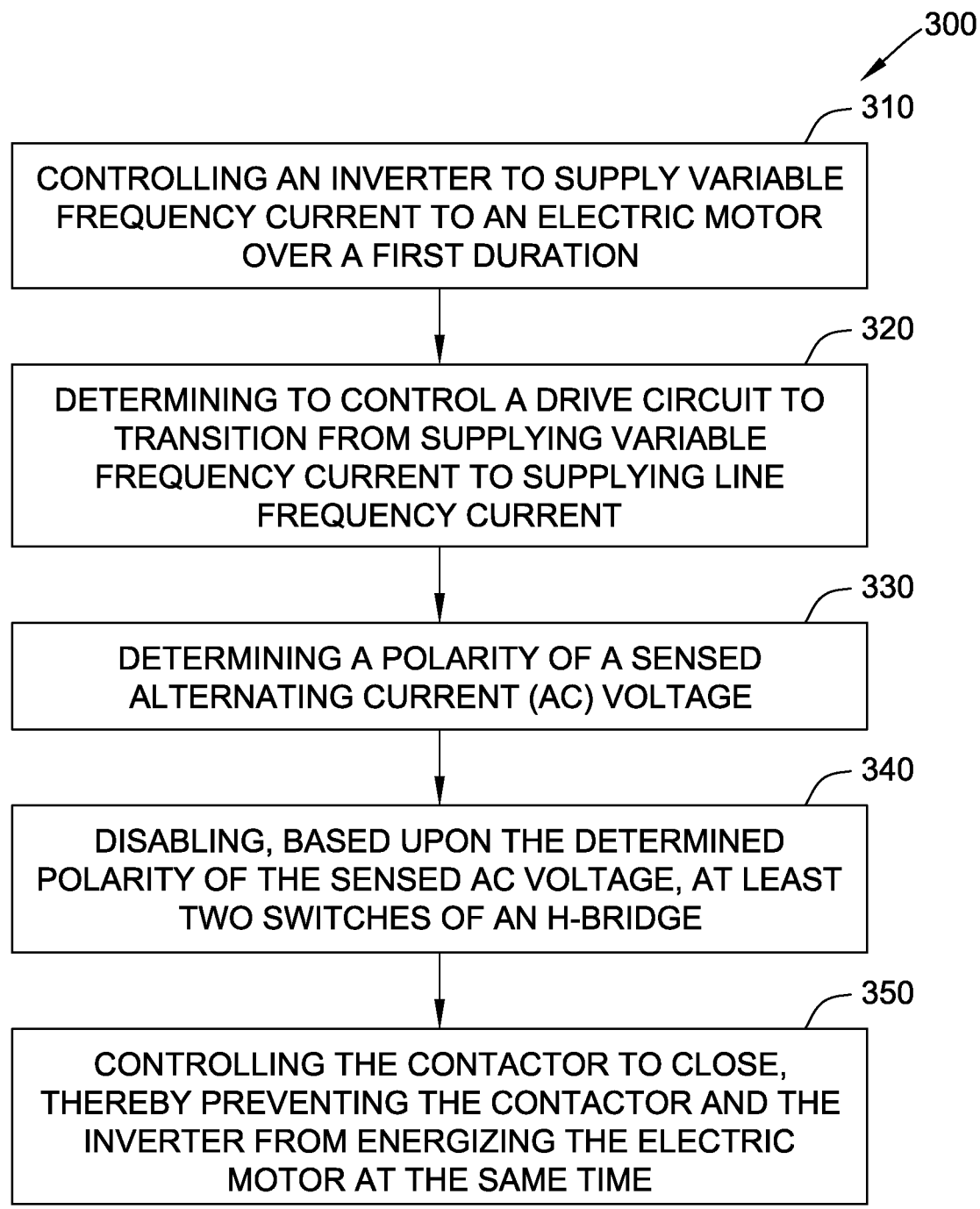
FIG. 3 is a flow diagram of an exemplary method of operating an electric motor in accordance with the present disclosure.
Figure 4:
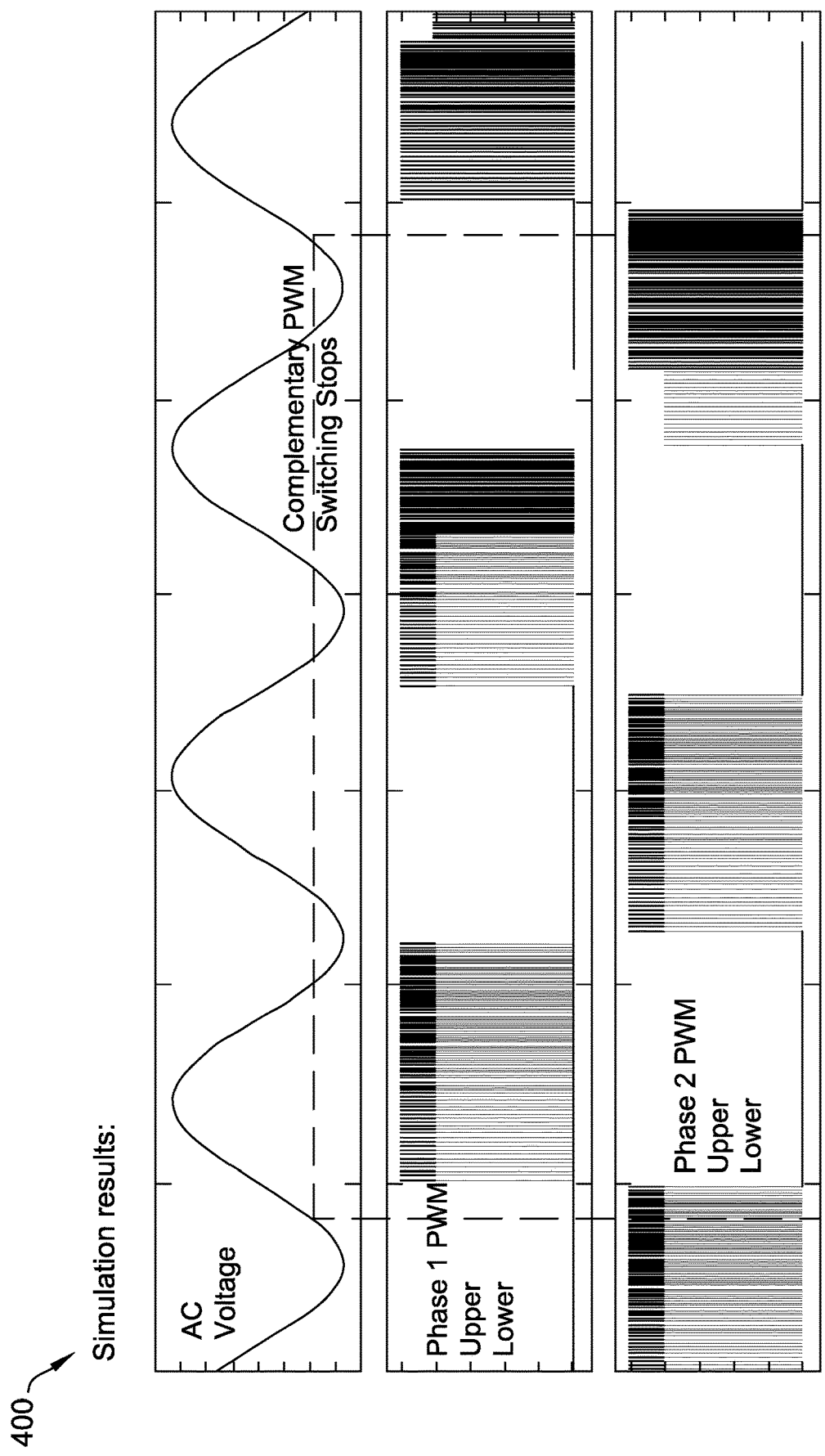
Figure 5:
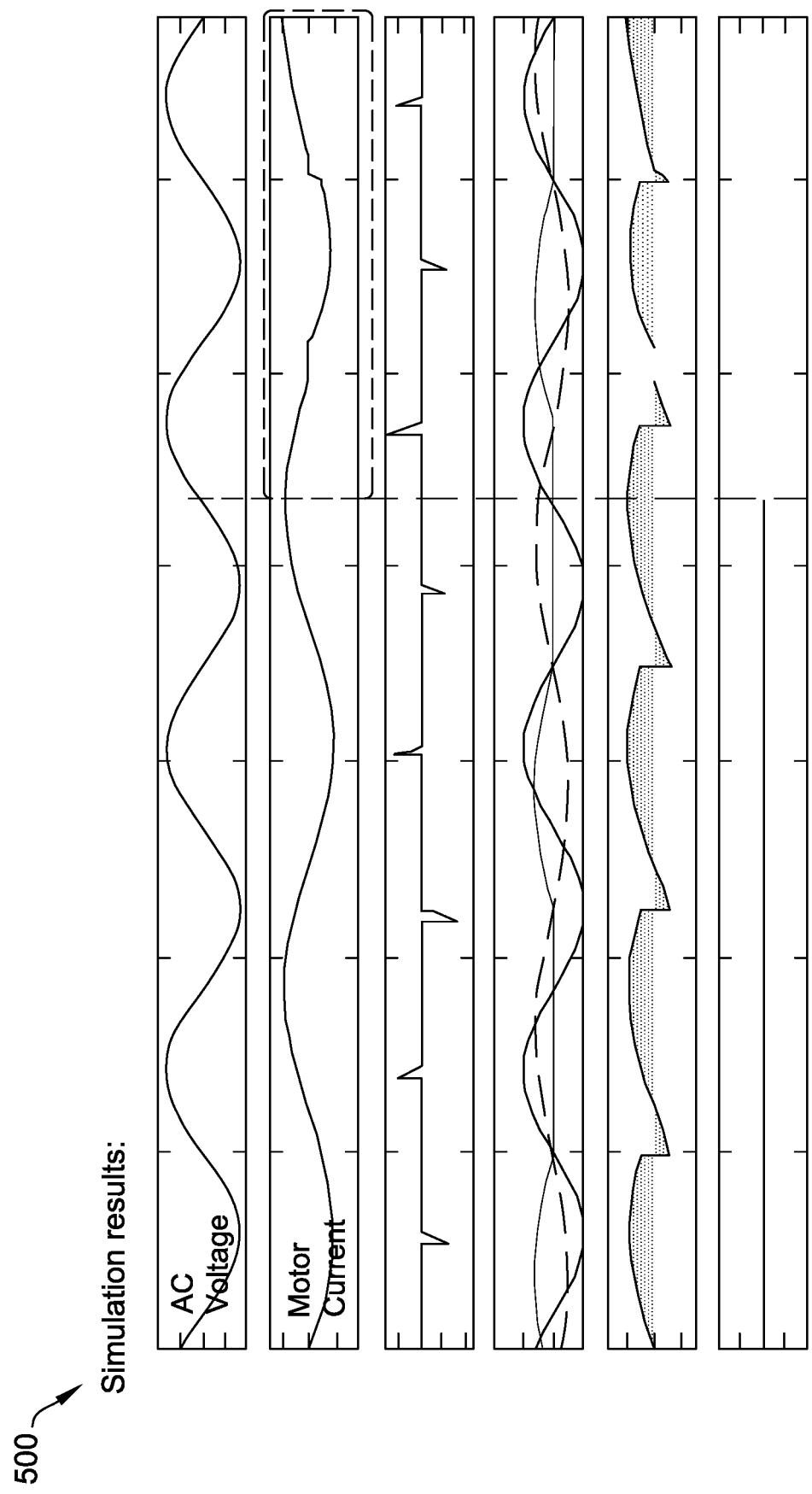
Figure 6:
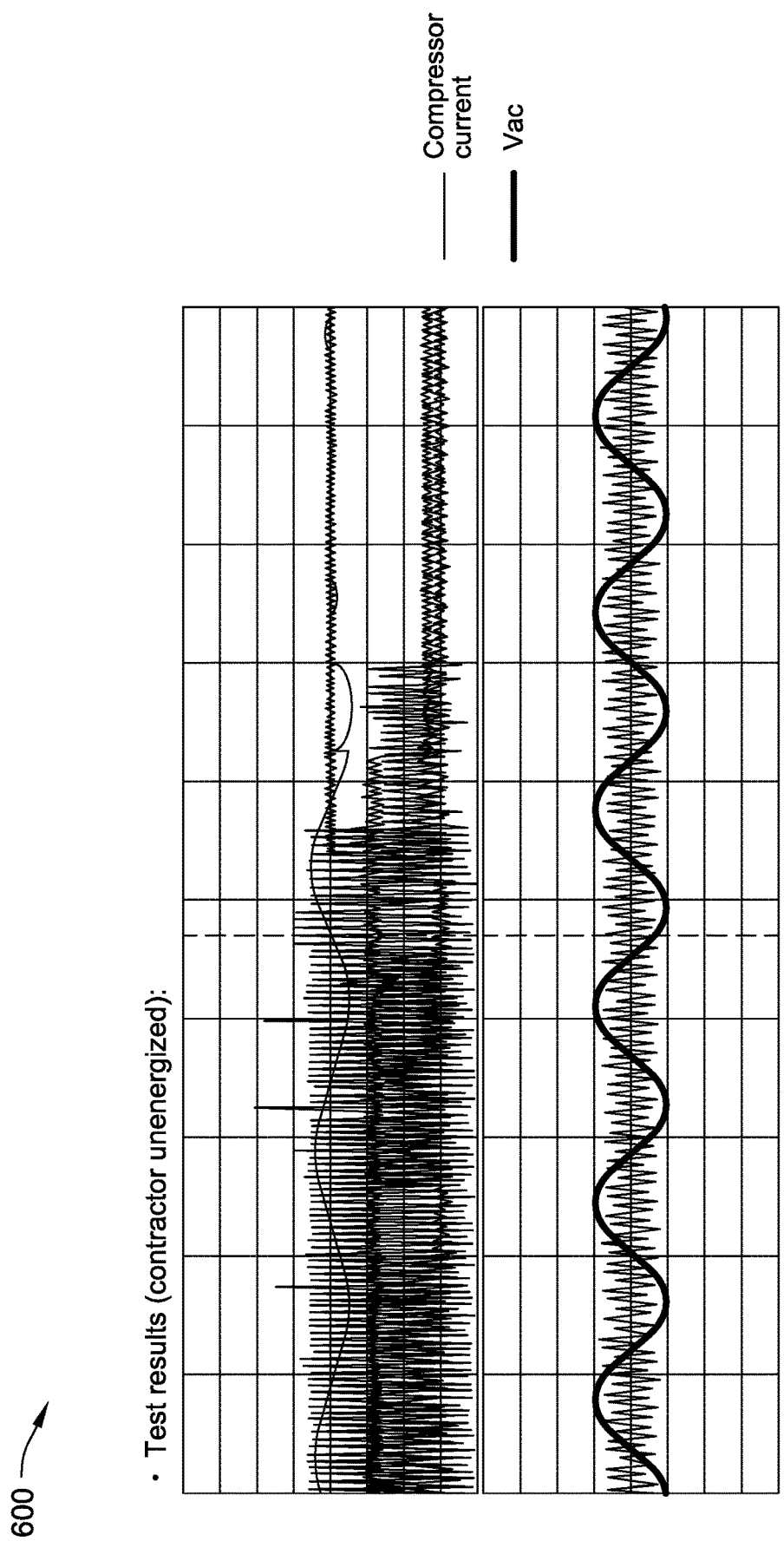

FIG. 3 is a flow diagram of an exemplary method 300 of operating an electric motor (e.g., electric motor 202, shown in FIG. 2), such as an induction motor or a permanent magnet motor. Method 300 includes controlling 310 an inverter (e.g., inverter 214) to supply variable frequency current to the electric motor over the first duration and determining 320 to control a drive circuit (e.g., drive circuit 200) to transition from supplying variable frequency current to supplying line frequency current. Method 300 also includes determining 330 a polarity of a sensed alternating current (AC) voltage, disabling 340, based upon the determined polarity of the sensed AC voltage, at least two switches of an H-bridge (e.g., H-bridge of inverter 214). Method 300 further includes controlling 350 a contactor (e.g., contactor 212) to close, thereby preventing the contactor and the inverter from energizing the electric motor at the same time.

In some embodiments, method 300 includes controlling the contactor to begin closing and controlling pulse width modulation (PWM) at the electric motor until the contactor is closed. In some embodiments, method 300 includes controlling PWM at the electric motor until the contactor is closed by controlling PWM at the electric motor for at least 1.5 line cycles. In some embodiments, method 300 includes determining the contactor is closed and controlling PWM at the electric motor until the controller determines that the contactor is closed. In some embodiments, method 300 includes disabling a third leg of the inverter and commutating a start winding of the electric motor. In some embodiments, method 300 includes controlling motor speed of the electric motor to be synchronized to a desired speed and controlling a phase of motor voltage to be synchronized to a desired phase.

FIGS. 4-7 are diagrams (400, 500, 600, and 700) of exemplary results produced by the exemplary drive circuit for an electric motor in accordance with the present disclosure. Diagram 400 illustrates exemplary AC voltage and PWM signals, while diagram 500 illustrates that current at a motor (e.g., motor 202) remains nearly sinusoidal for 1.5 line cycles while utilizing only two switches (e.g., the lower switch of switches 220 and the upper switch of switches 222) during the transition from inverter power to AC (line) power. Accordingly, the resulting compressor current shown in diagram 600 remains nearly sinusoidal when the contactor (e.g., contactor 212) is unenergized (open) and when the contactor is energized (closed) as shown in diagram 700. Thus, the systems and methods described herein result in a quasi-seamless transition from supplying inverter (e.g., inverter 214) power to supplying AC power—without dedicated line synchronization circuitry (e.g., additional switches/TRIAC s).

Some embodiments involve the use of one or more electronic or computing devices (e.g., for controlling operation of a drive circuit and/or individual components thereof). Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric motor system comprising:
a drive circuit configured to supply variable frequency current over a first duration and a contactor configured to supply line frequency current over a second duration, wherein the drive circuit includes a three-phase inverter and an H-bridge comprising two of the phases of the inverter;
an electric motor coupled to the drive circuit; and
a controller communicatively coupled to the drive circuit, wherein the controller configured to:
control the inverter to supply variable frequency current to the electric motor over the first duration;
determine to control the drive circuit to transition from supplying variable frequency current to supplying line frequency current;
determine a polarity of a sensed alternating current (AC) voltage;
disable, based upon the determined polarity of the sensed AC voltage, at least two switches of the H-bridge; and
control the contactor to close, thereby preventing the contactor and the inverter from energizing the electric motor at the same time once the contactor is closed.

2. The electric motor system of claim 1, wherein the controller is further configured to, in controlling the contactor to close:
control the contactor to begin closing; and
control pulse width modulation (PWM) at the electric motor until the contactor is closed.

3. The electric motor system of claim 2, wherein the controller is further configured to control PWM at the electric motor until the contactor is closed by controlling PWM at the electric motor for at least 1.5 line cycles.

4. The electric motor system of claim 2, wherein the controller is further configured to:
determine the contactor is closed; and
control PWM at the electric motor until the controller determines that the contactor is closed.

5. The electric motor system of claim 1, wherein the controller is further configured to, before determining a polarity of a sensed alternating current (AC) voltage:
disable a third phase of the inverter; and
commutate a start winding of the electric motor.

6. The electric motor system of claim 1, wherein the controller is further configured to:
control motor speed of the electric motor to be synchronized to a desired speed; and
control a phase of motor voltage to be synchronized to a desired phase.

7. The electric motor system of claim 1, wherein the controller is further determine to control the drive circuit to transition from supplying variable frequency current to supplying line frequency current based upon at least one input signal received at the controller.

8. An electric motor comprising:
a drive circuit configured to supply variable frequency current over a first duration and a contactor configured to supply line frequency current over a second duration, wherein the drive circuit includes a three-phase inverter and an H-bridge comprising two phases of the inverter; and
a controller communicatively coupled to the drive circuit, wherein the controller configured to:
control the inverter to supply variable frequency current to the electric motor over the first duration;
determine to control the drive circuit to transition from supplying variable frequency current to supplying line frequency current;
determine a polarity of a sensed alternating current (AC) voltage;
disable, based upon the determined polarity of the sensed AC voltage, at least two switches of the H-bridge; and
control the contactor to close, thereby preventing the contactor and the inverter from energizing the electric motor at the same time once the contactor is closed.

9. The electric motor of claim 8, wherein the controller is further configured to, in controlling the contactor to close:
   control the contactor to begin closing; and
   control pulse width modulation (PWM) at the electric motor until the contactor is closed.

10. The electric motor of claim 9, wherein the controller is further configured to control PWM at the electric motor until the contactor is closed by controlling PWM at the electric motor for at least 1.5 line cycles.

11. The electric motor of claim 9, wherein the controller is further configured to:
   determine the contactor is closed; and
   control PWM at the electric motor until the controller determines that the contactor is closed.

12. The electric motor of claim 8, wherein the controller is further configured to, before determining a polarity of a sensed alternating current (AC) voltage:
   disable a third phase of the inverter; and
   commutate a start winding of the electric motor.

13. The electric motor of claim 8, wherein the controller is further configured to:
   control motor speed of the electric motor to be synchronized to a desired speed; and
   control a phase of motor voltage to be synchronized to a desired phase.

14. The electric motor of claim 8, wherein the controller is further determine to control the drive circuit to transition from supplying variable frequency current to supplying line frequency current based upon at least one input signal received at the controller.

15. A method of operating an electric motor, wherein the electric motor is coupled to a drive circuit that is communicatively coupled to a controller, wherein the drive circuit is configured to supply variable frequency current over a first duration and a contactor configured to supply line frequency current over a second duration, wherein the drive circuit includes a three-phase inverter and an H-bridge comprising two phases of the inverter, said method comprising:
   controlling the inverter to supply variable frequency current to the electric motor over the first duration;
   determining to control the drive circuit to transition from supplying variable frequency current to supplying line frequency current;
   determining a polarity of a sensed alternating current (AC) voltage;
   disabling, based upon the determined polarity of the sensed AC voltage, at least two switches of the H-bridge; and
   controlling the contactor to close, thereby preventing the contactor and the inverter from energizing the electric motor at the same time once the contactor is closed.

16. The method of claim 15, further comprising, in controlling the contactor to close:
   controlling the contactor to begin closing; and
   controlling pulse width modulation (PWM) at the electric motor until the contactor is closed.

17. The method of claim 16, further comprising controlling PWM at the electric motor until the contactor is closed by controlling PWM at the electric motor for at least 1.5 line cycles.

18. The method of claim 16, further comprising:
   determining the contactor is closed; and
   controlling PWM at the electric motor until the controller determines that the contactor is closed.

19. The method of claim 15, further comprising, before determining a polarity of a sensed alternating current (AC) voltage:
   disabling a third phase of the inverter; and
   commutating a start winding of the electric motor.

20. The method of claim 15, further comprising:
   controlling motor speed of the electric motor to be synchronized to a desired speed; and
   controlling a phase of motor voltage to be synchronized to a desired phase.

* * * * *